(12) United States Patent
Vidal et al.

(10) Patent No.: US 8,799,890 B2
(45) Date of Patent: Aug. 5, 2014

(54) GENERATING A VERSION IDENTIFIER FOR A COMPUTING SYSTEM BASED ON SOFTWARE PACKAGES INSTALLED ON THE COMPUTING SYSTEM

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 792 days.

(21) Appl. No.: 12/627,744

(22) Filed: Nov. 30, 2009

(65) Prior Publication Data

US 2011/0131564 A1 Jun. 2, 2011

(51) Int. Cl.
*G06F 9/44* (2006.01)
*G06F 9/445* (2006.01)

(52) U.S. Cl.
CPC .................................. *G06F 8/61* (2013.01)
USPC ........... 717/174; 717/168; 717/169; 717/170; 717/171; 717/172; 717/173; 717/175; 717/176; 717/177; 717/178; 707/698; 709/223

(58) Field of Classification Search
None
See application file for complete search history.

(56) References Cited

U.S. PATENT DOCUMENTS

| | | | | |
|---|---|---|---|---|
| 5,619,716 | A * | 4/1997 | Nonaka et al. | 717/167 |
| 6,374,266 | B1 * | 4/2002 | Shnelvar | 1/1 |
| 6,381,742 | B2 * | 4/2002 | Forbes et al. | 717/176 |
| 7,089,552 | B2 * | 8/2006 | Atallah | 717/175 |
| 7,222,341 | B2 * | 5/2007 | Forbes et al. | 717/170 |
| 7,512,939 | B2 * | 3/2009 | Brookner | 717/170 |
| 7,730,325 | B2 * | 6/2010 | Morrow et al. | 713/191 |
| 7,761,425 | B1 * | 7/2010 | Erickson et al. | 707/649 |
| 7,991,832 | B2 * | 8/2011 | Hatanaka et al. | 709/203 |
| 8,161,053 | B1 * | 4/2012 | Khan et al. | 707/749 |
| 8,321,949 | B1 * | 11/2012 | Green et al. | 726/26 |
| 8,572,092 | B2 * | 10/2013 | Bern | 707/747 |
| 8,619,982 | B2 * | 12/2013 | Sitrick et al. | 380/200 |
| 2001/0029605 | A1 * | 10/2001 | Forbes et al. | 717/11 |
| 2002/0083343 | A1 | 6/2002 | Crosbie et al. | 713/201 |
| 2002/0144248 | A1 * | 10/2002 | Forbes et al. | 717/167 |
| 2002/0170052 | A1 * | 11/2002 | Radatti | 717/171 |
| 2003/0159070 | A1 | 8/2003 | Mayer et al. | 713/201 |
| 2004/0044996 | A1 * | 3/2004 | Atallah | 717/169 |
| 2005/0005155 | A1 * | 1/2005 | Morrow et al. | 713/200 |
| 2005/0102672 | A1 * | 5/2005 | Brothers | 718/1 |
| 2005/0131961 | A1 * | 6/2005 | Margolus et al. | 707/200 |
| 2005/0165852 | A1 * | 7/2005 | Albornoz et al. | 707/200 |
| 2005/0171961 | A1 * | 8/2005 | Culbreth et al. | 707/100 |
| 2006/0020578 | A1 * | 1/2006 | Hood | 707/3 |
| 2006/0020821 | A1 * | 1/2006 | Waltermann et al. | 713/189 |

(Continued)

OTHER PUBLICATIONS

Seth Kelby Vidal, "Systems and Methods for Tracking a History of Changes associated with Software Packages and Configuration Management in a Computer System", U.S. Appl. No. 12/551,523, filed Aug. 31, 2009.

(Continued)

*Primary Examiner* — Steven Snyder
(74) *Attorney, Agent, or Firm* — Lowenstein Sandler LLP (57) ABSTRACT

An administrator system can generate a version identifier for a computing system based on the software packages installed on a computing system. The version identifier can represent the software packages installed on the computing system. The administrator system can identify the software packages installed on a computing system and data specific to the software packages. The administrator system can apply a hash function to the specific data to generate hashed data. Then, the administrator system can concentrate the hashed data to generate the version identifier.

23 Claims, 4 Drawing Sheets

(56) References Cited

U.S. PATENT DOCUMENTS

| | | | | |
|---|---|---|---|---|
| 2006/0031827 | A1* | 2/2006 | Barfield et al. | 717/168 |
| 2006/0064488 | A1* | 3/2006 | Ebert | 709/225 |
| 2008/0134165 | A1* | 6/2008 | Anderson et al. | 717/173 |
| 2008/0270493 | A1* | 10/2008 | Schwaab et al. | 707/205 |
| 2008/0293379 | A1* | 11/2008 | Hinton et al. | 455/411 |
| 2009/0150974 | A1* | 6/2009 | Cho et al. | 726/2 |
| 2009/0300180 | A1 | 12/2009 | DeHaan et al. | 709/225 |
| 2010/0070606 | A1* | 3/2010 | Shenfield et al. | 709/217 |
| 2010/0318986 | A1* | 12/2010 | Burke et al. | 717/176 |
| 2011/0131564 | A1* | 6/2011 | Vidal et al. | 717/174 |
| 2013/0061036 | A1* | 3/2013 | Oliver | 713/150 |

OTHER PUBLICATIONS

Seth Kelby Vidal, "Systems and Methods for Improved Identification and Analysis of Threats to a Computing System", U.S. Appl. No. 12/610,564, filed Nov. 2, 2009.

Seth Kelby Vidal, "Systems and Methods for Utilizing a History of Changes Associated with Software Packages and Configuration Management to Manage Multiple Computing Systems", U.S. Appl. No. 12/610,610, filed Nov. 2, 2009.

Seth Kelby Vidal, "Systems and Methods for Tracking a History of Changes Associated with Software Packages in a Computing System", U.S. Appl. No. 12/551,475, filed Aug. 31, 2009.

Seth Kelby Vidal, "Systems and Methods for Managing a Network of Computer System Using a Version Identifier Generated Based on Software Packages Installed on the Computing Systems", U.S. Appl. No. 12/627,989, flied Nov. 30, 2009.

Seth Kelby Vidal, "Systems and Methods for Generating Machine State Verification Using Number of Installed Package Objects", U.S. Appl. No. 12/787,164, filed May 25, 2010.

Seth Kelby Vidal, "Systems and Methods for Generating Encoded Identifications of Selected Subsets of Installed Software Packages on a Client Machine", U.S. Appl. No. 12/768,330, filed Apr. 27, 2010.

Seth Kelby Vidal, "Systems and Methods for Determining Compatibility of a Software Package Update Using a Version Identifier", U.S. Appl. No. 12/713,271, filed Feb. 26, 2010.

Seth Kelby Vidal, "Systems and Methods for Detecting Computing Processes Requiring Reinitlalization After a Software Package Update", U.S. Appl. No. 12/714,178, filed Feb. 26, 2010.

* cited by examiner

GENERATING A VERSION IDENTIFIER FOR A COMPUTING SYSTEM BASED ON SOFTWARE PACKAGES INSTALLED ON THE COMPUTING SYSTEM

FIELD

This invention relates generally to computer software installation for computing systems and network management.

DESCRIPTION OF THE RELATED ART

Today, a person using a computing system has a variety of avenues for obtaining software and installing the software on the computing system, such as purchasing physical media and downloading the software over a network. When downloading the software over a network, the person can acquire and install the software using a software package management system. The software package management system typically consists of a software repository which stores and maintains various software packages. The software packages typically consist of software stored in an archive format that includes data for installing the software.

To obtain the software package, the person can utilize a package manager. The package manager is responsible for retrieving the software package and installing the software package on the computing system. Typically, the package manager maintains a record of how the software package was installed. However, the user of the computing system or an administrator overseeing the computing system cannot easily determine if the correct software package is installed on the computing system. For example, if the administrator is overseeing a large network of computing system, the administrator may desire to maintain the same software packages on all the computing systems. Typically, the administrator must examine each software package on each computing system to determine if the correct packages are installed. Moreover, a user of the computing system may desire to update the software packages. The user, however, lacks the ability to determine if the update will properly install on the system, for example, due to changes in the software packages since the last update.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for managing computing systems and software packages installed on the computing systems. More particularly, an administrator system can utilize a version identifier for the computing systems in order to track the software packages installed on the computing systems.

According to embodiments, an administrator system can be configured to generate a version identifier for a computing system based on the software packages installed on a computing system. The version identifier can be generated to represent the software packages installed on the computing system. In particular, the administrator system can be configured to include a version tool to generate the version identifier. The version tool can be configured to identify the software packages installed on the computing system and data specific to the software packages. For example, the specific data can include a name of the software package, an epoch of the software package, a version of the software package, a release of the software package, an arch of the software package, a checksum of the software package, and a format of the checksum. The version tool can be configured to identify the software packages and specific data by communicating with a package manager installed on the computing system.

According to embodiments, once the software packages and specific data are identified, the version tool can be configured to order the software packages and/or the specific data. The version tool can be configured to order the specific data based on an any ordering algorithm, such as alphabetically based on the name of the software packages, hierarchically based on the type of specific data, etc. Once ordered, the version tool can be configured to apply a hash function to the specific data to generate hashed data. The version tool can be configured to utilize any type of hash function to generate hashed data for example, Secure Hash Algorithm (SHA1, SHA2, etc.).

According to embodiments, once the hashed data is generated, the version tool can be configured to concentrate the hashed data to generate the version identifier. In particular, the version tool can be configured to concentrate the hashed data according to the ordering of the software packages and/or ordering of the specific data. Once generated, the version tool can be configured to store the version identifier and/or provide the version identifier to the computing system.

According to embodiments, the administrator system can utilize the version identifier for a variety of tasks. For example, the administrator system can compare the version identifier of the computing system to version identifier of other computing systems to determine if the software packages installed on the computing system match the software packages installed on the other computing systems. Additionally, the administrator system can utilize the version identifier to determine if updates to the software packages on the computing system will install properly.

By utilizing the version tool, the administrator system can generate a version identifier that represents the software packages installed on the computing system. As such, the administrator system can quickly and efficiently identify the software packages installed on a computing system without having to individually examine each software package on the computing system. Likewise, the administrator system can quickly and efficiently confirm that a group of computing systems have the same software packages installed.

Figure 1:
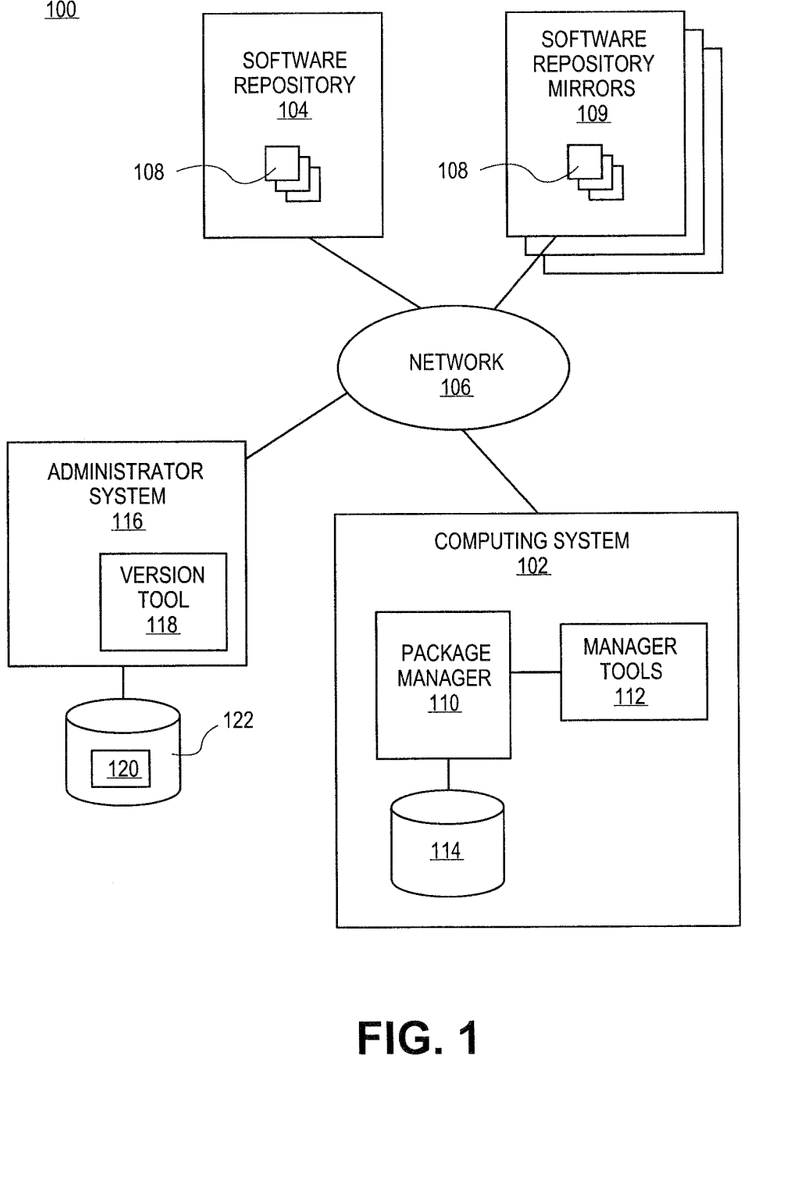
FIG. 1 illustrates an exemplary software package delivery and management system including an administrator system, in which various embodiments of the present teachings can be practiced.

FIG. 1 illustrates a software package delivery and management system 100, according to various embodiments of the present teachings. While FIG. 1 illustrates various components that can be included in the software package delivery and management system 100, one skilled in the art will realize that additional components can be added or existing components can be removed.

In embodiments, as illustrated in FIG. 1, the software package delivery and management system 100 can be designed to allow a computing system 102 to communicate with a software repository 104, via one or more networks 106, in order to obtain and install one or more software packages 108. The software repository 104 can be implemented as any type of open-source or proprietary software repository, which can store the software packages 108 and provide the software packages to computing systems, such as the computing system 102, requesting the software packages via the one or more networks 106. For example, the software repository 104 can be implemented as a Yum repository, Debian™ repository, or any other type of conventional software repository.

In embodiments, as described herein, the software packages 108, can include one or more software programs that are packaged together in a format that allows a package manger or package installer to install the software programs, contained in the software packages 108, on the computing system 102. The software programs included in the software packages 108 can be any type of software programs such as operating systems (OS), application programs, and the like. The software packages 108 can also include metadata that describes the software package, such as the name of the software package, the software programs included in the package, epoch, version, release and arch of the software package, description of the purpose of the software package, etc. The software packages 108 can also include metadata that aids in the installation of the software programs contained in the software packages 108, such as checksums, format of the checksums, and a list of dependencies of the software package. The checksums verify the integrity of the files of the software packages 108 e.g. that the files of the software packages 108 are complete and correct. The list of dependencies can describe the relationship of the software programs contained in the software packages 108 and any other software programs, file, software libraries, etc. required by the software packages 108.

In embodiments, the software repository 104 can store the software packages 108 in any type of open-source or proprietary format depending on the type of software repository 104. For example, the software packages 108 can be in conventional formats such as RPM format for a Yum repository, .deb format for a Debian™ repository, or other conventional formats.

In embodiments, the software package delivery and management system 100 can also include one or more software repository mirrors 109, coupled to the network 106. The software repository mirrors 109 can be configured to maintain copies of the software packages 108. The software repository mirrors 109 can be configured to backup the software repository 104. For example, the software repository mirrors 109 can provide the software packages 108 to computing systems, such as computing system 102, in the event that the software repository 104 is unavailable or the software repository 104 is experiencing high traffic.

In embodiments, the software repository 104 and the software repository mirrors 109 can be supported by any type of computing system capable of storing the software packages 108, capable of communicating with the one or more networks 106, and capable of running a repository application for cooperating with a package manager or package installer in order to deliver the software packages 108. For example, the software repository 104 and the software repository mirrors 109 can be supported by conventional computing systems or other devices such as such as servers, personal computers, laptop computers, network-enabled media devices, networked stations, etc. As such, the computing system supporting the software repository 104 and the software repository mirrors 109 can include conventional hardware such as processors, memory, computer readable storage media and devices (CD, DVD, hard drive, portable storage memory, etc.), network devices, and the like.

In embodiments, the one or more networks 106 can be or include the Internet, or other public or private networks. The one or more networks 106 can be or include wired, wireless, optical, and other network connections. One skilled in the art will realize that the one or more networks 106 can be any type of network, utilizing any type of communication protocol, to connect computing systems.

In embodiments, the computing system 102 can be any type of conventional computing system or other device such as such as servers, personal computers, laptop computers, network-enabled media devices, networked stations, etc. As such, the computing system 102 can include conventional hardware such as processors, memory, computer readable storage media and devices (CD, DVD, hard drive, portable storage memory, etc.), network devices, and the like.

In embodiments, the computing system 102 can be configured to include a package manager 110. The package manager 110 can be configured to cooperate with the software repository 104 to perform various actions associated with the software packages 108. For example, the package manager 110 can be configured to retrieve one or more of the software packages 108 and configured to install the software packages on the computing system 102. Likewise, the package manager 110 can be configured to retrieve updates to software packages 108, already installed on the computing system 102, and install the updates on the computing system 102.

In embodiments, the package manager 110 can be configured to cooperate with manager tools 112 to perform actions related to the software packages 108. For example, the manager tools 112 can be configured to install and update particular application programs, files, or software libraries maintained by the software repository 104. As such, the manager tool 112 can be configured to provide a request to the package manager 110 to perform the installation or update.

In embodiments, the package manager 110 can be configured to allow a user of the computing system 102 to request the various actions associated with the software repository 104 to be performed. To achieve this, the package manager 110 can be configured to provide command line or graphical user interfaces (GUIs) that allow the user to direct the package manager 110 to perform the actions. For example, the package manager 110 can provide GUIs that display the software packages 108, such as new software packages and software package updates, available in the software repository 104 and that allow the user to select the action to be performed related to the software packages 108.

In embodiments, in order to perform the various actions, the package manager 110 can be configured to communicate with the software repository 104 and retrieve data from the software repository 104. For example, when providing the GUIs to a user of the computing system 102, the package manager 110 can retrieve a list of the software packages 108 from the software repository 104. Likewise, for example, when installing or updating a particular software package 108, the package manager 110 can retrieve the particular software package 108 and any other data associated with the particular software package 108.

In embodiments, when performing the various actions, the package manager 110 can be configured to utilize the metadata associated with the software packages 108 in order to perform the actions. For example, when installing a particular software package 108 or updating a particular software package 108, the package manager 110 can access the metadata associated with the particular software packages 108 in order to properly install or update the software packages on the computing system 102. For instance, the package manager 110 can utilize the checksums and the list of dependencies in the metadata in order to identify and verify the software programs, files, and software libraries that are affected. Additionally, when performing the various actions, the package manager 110 can be configured to store the metadata in a database 114.

In embodiments, the package manager 110 can be any application program that is capable of executing on the computing system 102 to perform the actions related to the software repository 104. For example, the package manager 110 can be any type of conventional open-source or proprietary package manager such as Yum package manager, Debian™ package manager, and the like. The package manager 110 can be stored on computer readable storage devices or media (CD, DVD, hard drive, portable storage memory, etc.) of the computing system 102 and executed by the computing system 102.

In embodiments, the software package delivery and management system 100 can also include an administrator system 116. The administrator system 116 can be configured to manage the software repository 104, software repository mirrors 109, and/or the computing system 102 via the network 106. For example, the administrator system 116 can be configured to manage the software repository 104 and/or software repository mirrors 109 and provide support to the computing system 102 when installing the software packages 108. Likewise, for example, the administrator system 116 can be configured to manage the computing system 102 to ensure that the computing system 102 is properly configured and that the correct software packages 108 are installed on the computing system 102.

In embodiments, the administrator system 116 can be any type of computing system or other device such as such as a server, personal computer, laptop computer, network-enabled media device, networked station, etc. The administrator system 116 can be coupled to the one or more networks 106 in order to communicate with the computing systems 102, the software repository 104, and the software repository mirrors 109.

In embodiments, the administrator system 116 can be configured to generate a version identifier for a computing system based on the software packages 108 installed on a computing system 102. The version identifier can be data of fixed size such as a number, character string, etc., derived from the software packages installed on the computing system 102, that provides a "snap shot" of the particular software packages installed on the computing system 102. To achieve this, the administrator system 116 can be configured to include a version tool 118.

In embodiments, the version tool 118 can be implemented as an application program that is capable of executing on the administrator system 116 to perform the processes as described herein. As such, the version tool 118 can be configured to include the necessary logic, commands, instructions, and protocols in order to perform the methods and processes described herein. Likewise, the version tool 118 can be implemented as a portion of another application program of the administrator system 116, such as the OS or management software. In either case, the version tool 118 can be stored on computer readable storage devices or media (CD, DVD, hard drive, portable storage memory, etc.) of the administrator system 116 and executed by the administrator system 116.

In embodiments, the version tool 118 can be configured to identify particular software packages 108 installed on the computing system 102. In particular, the version tool 118 can be configured to identify the names of the particular software packages 108 and data specific to the particular software packages 108 installed on the computing system 102. For example, the specific data can include names of the software packages, epochs of the software packages, versions of the software packages, releases of the software packages, archs of the software packages, checksums of the software package, and formats of the checksums.

In embodiments, to identify the particular software packages 108, the version tool 118 can be configured to communicate with the package manager 110 installed on the computing system 102. To achieve this, the version tool 118 can be configured to include the necessary logic, commands, instructions, and protocols to communicate with the package manager 110 via the network 106.

In embodiments, once the software packages and specific data are identified, the version tool 118 can be configured to order the software packages and/or the specific data. The version tool 118 can be configured to order the software packages and/or specific data based on any ordering algorithm, such as alphabetically based on the name of the software packages 108, hierarchically by software package type based on dependencies, hierarchically by the type of specific data, and the like.

In embodiments, once ordered, the version tool 118 can be configured to apply a hash function to the specific data to generate hashed data. The version tool 118 can be configured to utilize any type of hash function to generate hashed data on a fixed size, for example, Secure Hash Algorithm (SHA1, SHA2, etc.). Once the hashed data is generated, the version tool 118 can be configured to concentrate the hashed data to generate the version identifier. In particular, the version tool 118 can be configured to concentrate the hashed data according to the ordering of the software packages and/or specific data.

Figure 2:
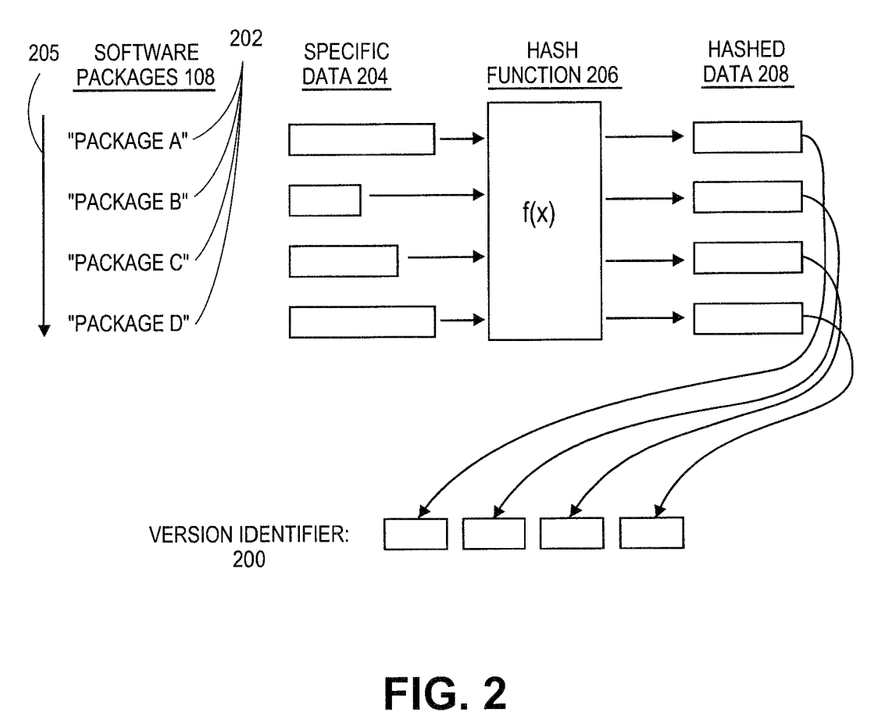
FIG. 2 illustrates an exemplary process for generating a version identifier, according to various embodiments.

FIG. 2 illustrates an exemplary method for generating a version identifier 200 utilizing the processes described above, according to various embodiments. As illustrated in FIG. 2, for example, the version tool 118 can identify four (4) particular software packages 202 from the software packages 108 that are installed on the computing system 102. Likewise, the version tool 118 can identify the specific data 204 associated with the software packages 202. As illustrated, the specific data 204 can be any type of data (numbers, character strings, etc.) in any format that is specific to a software package and can be different data sizes (different number of bits).

For example, "Package A" can be a version of Yum with the specific data 204: package name—"yum", package epoch—"0", package version—"3.2.25", package release—"1.fc12", package arch—"noarch", package checksum type—"sha256", package checksum—"cc8623522dc4bb1e2c0856e58f57119a00a34abee79128 bcfa3f7126936".

In embodiments, the version tool 118 can be configured to order the software packages 202 and specific data 204 according to an order procedure 205, such as alphabetically by software package name, hierarchically by software package type based on dependencies, hierarchically by specific data type based on dependencies, hierarchically based on software package version, and combinations thereof. The version tool 118 can be configured to order the software packages 202 so that the software package 202 and/or specific data 204 order is consistent each time a version identifier is generated. In other words, the version tool 118 can order the software packages 202 and/or specific data 204 such that, if a version identifier was generated for a different computing which has the same software packages, the version tool 118 would create the same version identifier.

In embodiments, the version tool 118 can be configured to apply a hash function 206 to the specific data 204 to generate the hashed data 208. As illustrated, the hash function 206 can be any type of defined procedure or mathematical function which converts large, possibly variable-sized data into fixed output data size (number of bits).

In embodiments, the version tool 118 can be configured to concentrate the hashed data 208 to generate the version identifier 200. As illustrated, the version tool 118 can be configured to concentrate the hashed data 208 according to the order procedure 205. As such, the version tool 118 can repeatably generate the same version identifier 200 for the same set of software packages 202.

In embodiments, once generated, the version tool 118 can be configured to store the version identifier. As illustrated in FIG. 1, the version tool 118 can be configured to store the version identifier in a version record 120. The version record 120 can be configured to include an identification of the computing system 102 (e.g. name of the user of computing system 102, network address of the computing system 102, etc.), names of the software packages 108 installed on the computing system 102, and the version identifier. The version tool 118 can be configured to maintain the version record 120 in a repository 122, such as a database. The repository 122 can be stored on computer readable storage devices or media (CD, DVD, hard drive, portable storage memory, etc.) of the administrator system 116.

In embodiments, the version tool 118 can be configured to provide the version identifier to the computing system 102. For example, the version tool 118 can be configured to provide the version identifier to the computing system 102 via the network 106.

In embodiments, the administrator system 116 can utilize the version identifier for a variety of tasks. For example, the administrator system 116 can compare the version identifier of the computing system 102 to version identifiers of other computing systems (not shown) to determine if the software packages installed on the computing system 102 match the software packages installed on the other computing systems. Additionally, the administrator system 116 can utilize the version identifier to determine if updates to the software packages on the computing system will install properly.

In embodiments, as described above, when communicating with the computing systems 102, the software repository 104, and/or the software repository mirrors 109, the administrator system 116 can be configured to utilize any type of network management application or tool, located separate from or incorporated in the administrator system 116, to securely communicate with the computing systems 102, to monitor the state of the computing systems 102, to retrieve and request data from the computing systems 102, and to manage and direct the computing systems 102. For example, the administrator system 116 can utilize a "FUNC" server as described in U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. patent application Publication No. 8713177) assigned to Red Hat™ Corporation, the disclosure of which is incorporated herein, in its entirety, by reference.

Figure 3:
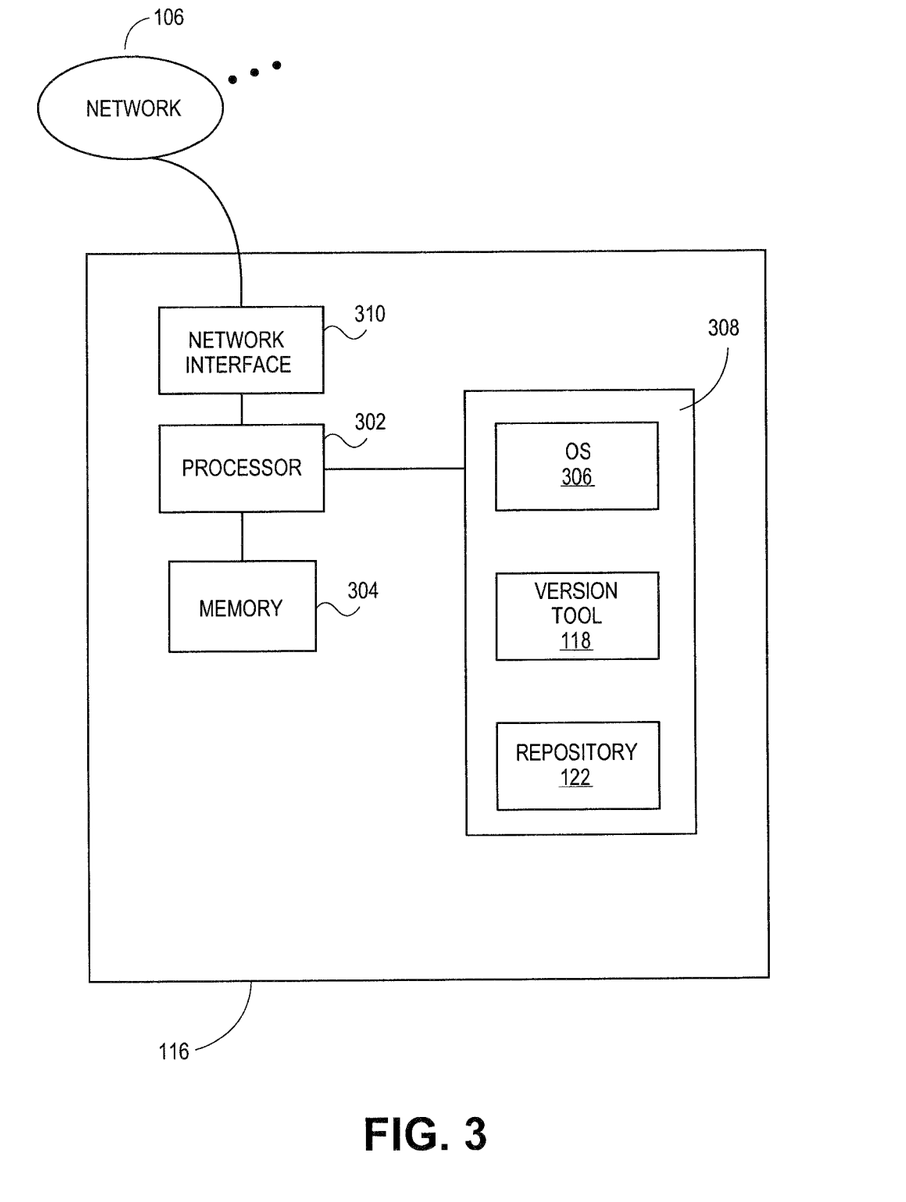
FIG. 3 illustrates an exemplary hardware configuration for an administrator system, according to various embodiments.

FIG. 3 illustrates an exemplary diagram of hardware and other resources that can be incorporated in the administrator system 116 and configured to communicate with the computer systems 102 via one or more networks 106, according to embodiments. In embodiments as shown, the administrator system 116 can comprise a processor 302 communicating with memory 304, such as electronic random access memory, operating under control of or in conjunction with operating system 306. Operating system 306 can be, for example, a distribution of the Linux operating system, such as Red Hat™ Enterprise Linux, Fedora, etc., the Unix™ operating system, or other open-source or proprietary operating system or platform. Processor 302 also communicates with one or more computer readable storage devices or media 308, such as hard drives, optical storage, and the like, for maintaining the operating system 306, the version tool 118, and the repository 122. Processor 302 further communicates with network interface 310, such as an Ethernet or wireless data connection, which in turn communicates with one or more networks 106, such as the Internet or other public or private networks.

Processor 302 also communicates with the version tool 118 and the repository 122 to execute control logic and allow performance of the processes as described herein. Other configurations of the administrator system 116, associated network connections, and other hardware and software resources are possible.

While FIG. 3 illustrates the administrator system 116 as a standalone system including a combination of hardware and software, the administrator system 116 can include multiple systems operating in cooperation. The version tool 118 can be implemented as a software application or program capable of being executed by the administrator system 116, as illustrated, or other conventional computer platforms. Likewise, the version tool 118 can also be implemented as a software module or program module capable of being incorporated in other software applications and programs, such as the operating system of the administrator system 116 and/or combined in a single application or program. In any example, the version tool 118 can be implemented in any type of conventional proprietary or open-source computer language. When implemented as a software application or program code, the version tool 118 can be stored in a computer readable storage medium, such as storage 308, accessible by the administrator system 116. Likewise, during execution, a copy of the version tool 118 can be stored in the memory 304.

Figure 4:
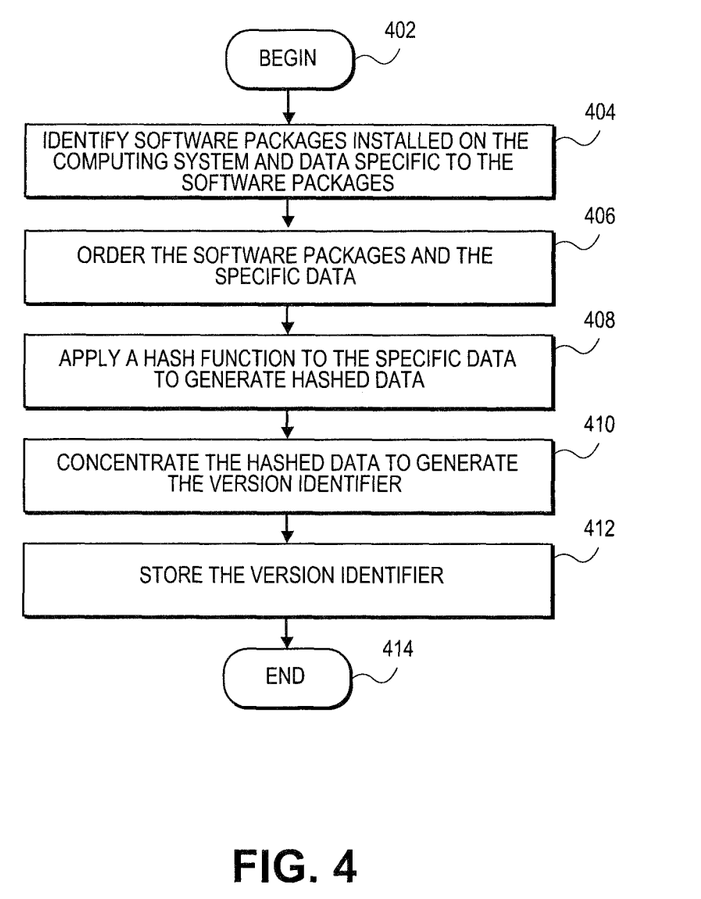
FIG. 4 illustrates a flowchart of an exemplary process for generating a version identifier, according to various embodiments.

FIG. 4 illustrates a flow diagram for generating a version identifier, according to embodiments of the present teachings. In 402, the process can begin. In 404, the administrator system 116 can identify the software packages installed on the computing system 102 and the specific data associated with the software packages. The administrator tool 116 can communicate with the package manager 110 in order to determine the software packages and the specific data.

In 406, the administrator system 116 can order the software packages and the specific data. The administrator system 116 can order the software packages and/or the specific data according to an order procedure, such as alphabetically by software package name, hierarchically by software package type based on dependencies, hierarchically by type of specific data, hierarchically by version of software packages, and combination thereof The administrator system 116 can order the software packages and/or the specific data so that the software package order is consistent each time a version identifier is generated.

In 408, the administrator system 116 can apply a hash function to the specific data to generate hashed data. The hash function can be any type of defined procedure or mathematical function which converts large, possibly variable-sized data into fixed output data size (number of bits), such as SHA.

In 410, the administrator system 116 can concentrate the hashed data to generate the version identifier. The administrator system 116 can concentrate the hashed data according to the order procedure. As such, the administrator system can repeatably generate the same version identifier for the same set of software packages.

In 412, the administrator system 116 can store the version identifier. The administrator system 116 can store the version identifier in a version record 120 in the repository 122. The version record 120 can be configured to include an identification of the computing system 102 (e.g. name of the user of computing system 102, network address of the computing system 102, etc.), names of the software packages 108 installed on the computing system 102, and the version identifier.

In 414, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   identifying first data specific to a first software package and second data specific to a second software package;
   applying, by a processor, a hash function to the first data to generate first hashed data;
   applying, by the processor, the hash function to the second data to generate second hashed data;
   combining at least the first hashed data and the second hashed data to generate a set of hashed data;
   generating, by the processor, a version identifier based on the set of hashed data; and
   storing the version identifier.

2. The method of claim 1, wherein generating the version identifier comprises compressing the set of hashed data.

3. The method of claim 1, the method further comprising ordering the set of hashed data.

4. The method of claim 3, wherein generating the version identifier comprises concatenating the set of hashed data according to the ordering.

5. The method of claim 1, wherein the first data comprises at least one of a name of the software package, an epoch of the software package, a version of the software package, a release of the software package, an arch of the software package, a checksum of the software package, or a format of the checksum.

6. The method of claim 1, wherein the hash function is a Secure Hash Algorithm.

7. The method of claim 1, further comprising providing the version identifier.

8. A computer readable storage medium comprising instructions for causing a processor to perform operations comprising:
   identifying first data specific to a first software package and second data specific to a second software package;
   applying, by the processor, a hash function to the first data to generate first hashed data;
   applying, by the processor, the hash function to the second data to generate second hashed data;
   combining at least the first hashed data and second hashed data to generate a set of hashed data;
   generating, by the processor, a version identifier based on the set of hashed data comprising at least the first hashed data and the second hashed data; and
   storing the version identifier.

9. The computer readable storage medium of claim 8, wherein generating the version identifier comprises compressing the set of hashed data.

10. The computer readable storage medium of claim 8, the operations further comprising ordering the set of hashed data.

11. The computer readable storage medium of claim 10, wherein generating the version identifier comprises concatenating the set of hashed data according to the ordering.

12. The computer readable storage medium of claim 8, wherein the first data comprises at least one of a name of the software package, an epoch of the software package, a version of the software package, a release of the software package, an arch of the software package, a checksum of the software package, or a format of the checksum.

13. The computer readable storage medium of claim 8, wherein the hash function is a Secure Hash Algorithm.

14. The computer readable storage medium of claim 8, the operations further comprising providing the version identifier.

15. A system comprising:
   a memory; and
   a processor coupled to the memory and to:
   identify first data specific to a first software package and second data specific to a second software package;
   apply a hash function to the first data to generate first hashed data;
   apply the hash function to the second data to generate second hashed data;
   combine at least the first hashed data and second hashed data to generate a set of hashed data;
   generate a version identifier based on a set of hashed data comprising at least the first hashed data and the second hashed data; and
   store the version identifier.

16. The system of claim 15, wherein the processor is to generate the version identifier by compressing the set of hashed data.

17. The system of claim 15, the processor is further to order the set of hashed data.

18. The system of claim 17, wherein the processor is to generate the version identifier by concatenating the set of hashed data according to the ordering.

19. The system of claim 15, wherein the first data comprises at least one of a name of the software package, an epoch of the software package, a version of the software package, a release of the software package, an arch of the software package, a checksum of the software package, or a format of the checksum.

20. The system of claim 15, wherein the processor is further to provide the version identifier.

21. The method of claim 1, wherein the version identifier represents the first and second software packages.

22. The computer readable storage medium of claim 8, wherein the version identifier represents the first and second software packages.

23. The system of claim 15, wherein the version identifier represents the first and second software packages.

\* \* \* \* \*